United States Patent [19]

Menard

[11] Patent Number: 5,896,889
[45] Date of Patent: Apr. 27, 1999

[54] QUICK-SET HYDRAULIC COUPLER

[76] Inventor: Orville R. Menard, 14801 Hebron Rd., Harvard, Ill. 60033

[21] Appl. No.: 08/957,274

[22] Filed: Oct. 24, 1997

[51] Int. Cl.⁶ .................................................. F16L 37/28
[52] U.S. Cl. .................................. 137/614.04; 137/614
[58] Field of Search ............................. 137/614.04, 614

[56] References Cited

U.S. PATENT DOCUMENTS

| | | | |
|---|---|---|---|
| 3,386,754 | 6/1968 | Morrison | 285/316 |
| 3,680,893 | 8/1972 | Giraud | 285/39 |
| 3,730,221 | 5/1973 | Vik | 137/614.04 |
| 3,779,586 | 12/1973 | Rossiter | 285/308 |
| 3,866,957 | 2/1975 | Norton | 285/316 |
| 3,966,239 | 6/1976 | Heckenkamp | 285/316 |
| 4,014,467 | 3/1977 | Ferguson | 285/316 |
| 4,074,698 | 2/1978 | Hobson et al. | 137/614.04 |
| 4,198,080 | 4/1980 | Carpenter | 285/277 |
| 4,988,129 | 1/1991 | Saito et al. | 285/328 |
| 5,026,099 | 6/1991 | Hendrix | 285/315 |
| 5,165,728 | 11/1992 | Mayer | 285/12 |
| 5,310,226 | 5/1994 | Norkey | 285/16 |
| 5,374,085 | 12/1994 | Beatrice et al. | 285/81 |
| 5,462,316 | 10/1995 | Street et al. | 285/81 |
| 5,509,695 | 4/1996 | Hummell | 285/23 |
| 5,553,899 | 9/1996 | Norkey et al. | 285/316 |

FOREIGN PATENT DOCUMENTS

| | | | |
|---|---|---|---|
| 685048 | 4/1964 | Canada | 137/614.04 |
| 2749395 | 5/1979 | Germany | 137/614.04 |

*Primary Examiner*—A. Michael Chambers
*Attorney, Agent, or Firm*—Lockwood, Alex, Fitzgibbon & Cummings

[57] ABSTRACT

A quick-set hydraulic coupler for use with the standard telescoping-type fluid or gas connectors on equipment within the agricultural, trucking, or tractor-trailer fields. The quick-set coupler includes a female half and a male half whereby the female half is mounted and includes a ring for engaging a lever. Depressing the lever will extend a spring biased inner member of the female half and expose a ring of retractable ball bearings that engage the male half. The lever is then released and the inner member retracts along with the coupled male member to form a tight seal.

6 Claims, 3 Drawing Sheets

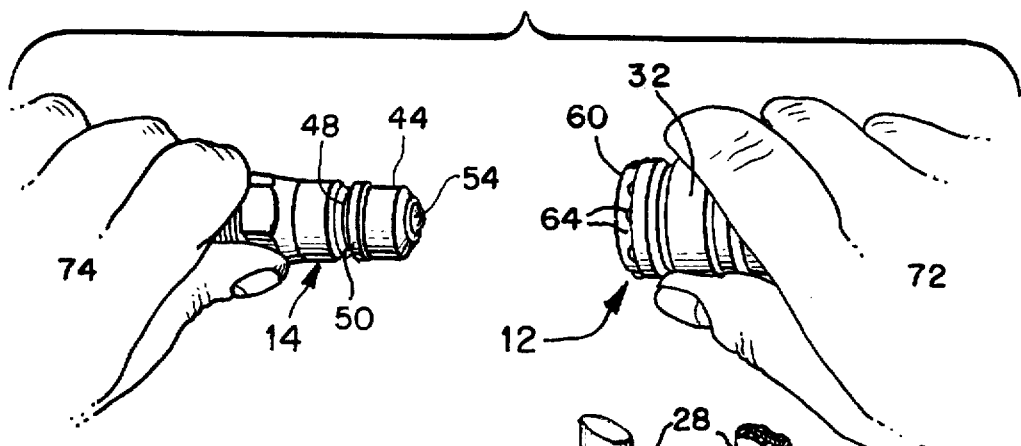
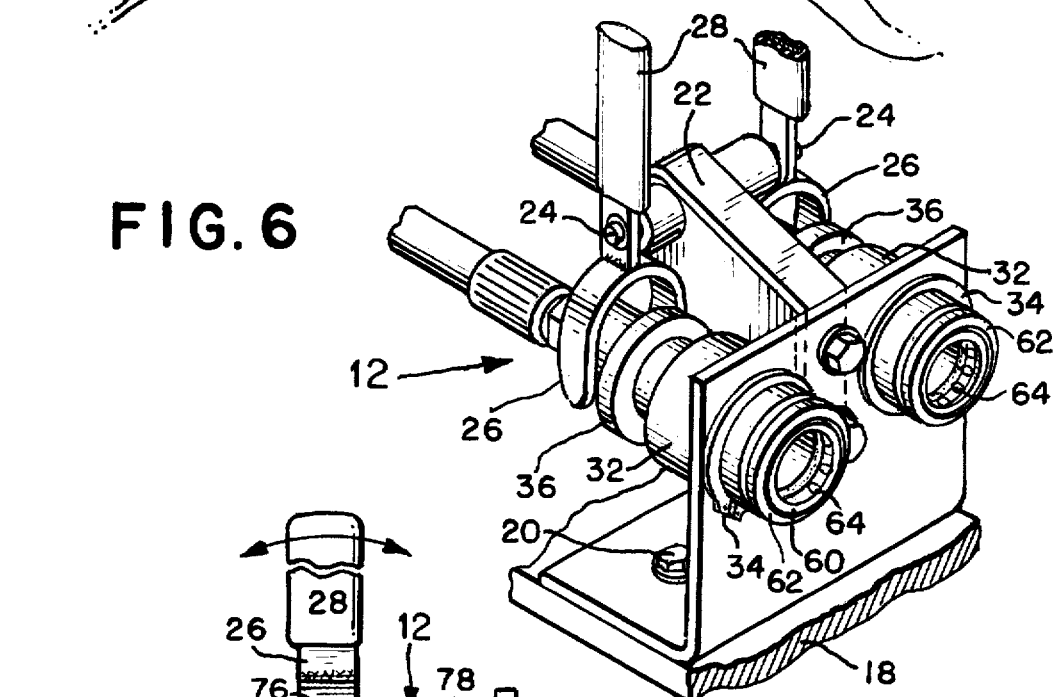
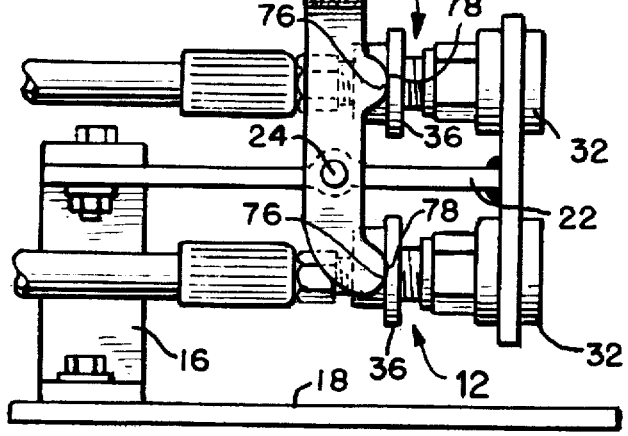
FIG. 5
FIG. 6
FIG. 7

QUICK-SET HYDRAULIC COUPLER

BACKGROUND OF THE INVENTION

The present invention relates generally to the use of a quick-set hydraulic coupler to connect and disconnect fluid or gas lines in equipment within the agricultural, trucking, or tractor-trailer field. More particularly, the present invention relates to such hydraulic coupler systems having a female sleeve encircled with balls retractable into and extendable out of a housing, and specifically on such systems using a lever to extend the sleeve.

Connectors for fluid lines and the like are typically of the telescoping type. Such a design utilizes inner and outer telescoping members in which the inner telescoping member sealingly fits within an opening of the outer telescoping member to create a tightly sealed fit. This connection is held in retention by means of several spaced, metal balls which project through the wall of the aperture of the outer telescoping member, to fit into an outer circumferential groove of the inner member for retention thereof. The balls are held in their inwardly projecting, retaining position by an outer sleeve positioned on the outer member which presses the balls inwardly. To couple and decouple the connector, the outer sleeve is axially displaced to free the balls so that they may retract outwardly, in which position the inner telescoping member may slide into or out of the outer member.

Manually connecting and disconnecting such a coupler system creates several difficulties. Most important of these is the time and effort needed to connect the lines. Interconnecting the coupling parts requires that the worker exert a force on the female coupling member towards the male coupling member and while maintaining this force, apply a force to the sleeve in the opposite direction to free the metal balls so that the male member may slide into and out of the female member. This third step may require a third hand if the members are too big for a single person to connect. A second person may also be needed in the event that the equipment needs to be operated in the rain or when the equipment is oily and too slippery to grasp by a single person.

An advancement in such telescoping type connectors if found in U.S. Pat. No. 5,374,085, issued Dec. 20, 1994 which describes a locking device for fluid coupling. The purpose of this patent is to permit a conventional quick disconnect fluid coupling to be rendered more secure by a simple mechanical locking device. The locking device comprises upper and lower half shells that in turn define first and second axially spaced annular abutment surfaces. The first surface is adapted to engage the flange on the fluid coupling component carrying the release collar, and the second surface is adapted to engage the release collar itself. These half shells are held in place by means of one or more threaded fasteners. Although this device utilizing a locking collar does not solve the problem associated with the inadvertent release of such couplers, it unfortunately creates a few new problems. Such a locking collar tends to keep the two members connected when their break-away feature is most needed. Quick connect couplers typically have a safety feature that allows the connection to break-away during excessive axial loading. This prevents accidental damage upon both the supply equipment and the equipment receiving the fluid. A locking collar of this type may prevent the safety break-away and cause undesirable and unnecessary damage.

Attempts to solve the problems associated with manually connecting and disconnecting such couplers have fallen upon the use of levers to extend the female coupler so as to enable an attachment to its male counterpart. One such attempt was disclosed in U.S. Pat. No. 3,779,586, issued Dec. 18, 1973 on a hose coupling connect and disconnect mechanism. This patent makes it possible to easily effect a connection between hydraulic male and female members by the use of an actuator forming a part of the female member such that in grasping the lever elements of the actuator the female member is also being held for positioning relative to the male member. This requires the use of only one hand for holding the female coupling member and moving the locking sleeve. Although this does decrease the amount of time and effort needed to effect a connection, it still requires a certain amount of skill and patience. Both members are maneuvered by hand and need to be aligned correctly for attachment.

In order to prevent this problem of having to handle both members, there has been an effort in the art to develop a structure whereby one of these members is mounted onto a stable environment and only the other member needs to be maneuvered by hand for correct alignment. For example, U.S. Pat. No. 3,966,239, issued Jun. 29, 1976 describes a release for break-away coupling that attempts to do just that. A bracket is provided which is mounted on the supply source vehicle. A coupling is mounted on the bracket with a hinge collar, and on the coupling is a spacer sleeve having a radial flange which slidably moves the housing of the socket section. A lever is positioned on the hinge collar, and when its pivoted about its fulcrum it biases the spacer sleeve to position the coupling in a disengaging position.

Another attempt to mount one of the members was disclosed in U.S. Pat. No. 3,386,754, issued Jun. 4, 1968. In this patent for a hose coupling connect and disconnect mechanism, a coupling is supported on the tractor by a member engaging the sleeve and the female coupling half and pivotally supported for swinging movement. A level is mounted on the sleeve-engaging member for displacing the female coupling half relative to its sleeve in order to facilitate coupling or uncoupling the male coupling half.

The combination of mounting the female member and biasing it for coupling and uncoupling by the use of a lever have been shown in the last two patents as a competent solution to some of the aforementioned problems with hydraulic couplers. However, such design structure as illustrated in this art has provided a somewhat awkward solution. These previous designs limit the positioning of the lever as they are only compatible with limited equipment, and at times place the lever in a position that may become difficult to reach by a worker or be inadvertently engaged.

In view of the aforementioned needs and the shortcomings of the prior art, it is therefore an object of the present invention to provide an apparatus that overcomes the deficiencies of the current practices whereby a device is provided to quickly connect and disconnect a hydraulic coupler with minimal time and effort.

It is another object of the present invention to provide a quick set hydraulic coupler utilizing a level which is positioned so that inadvertent actuation is minimized while still possessing the break away feature of common couplers.

Still another object of the present invention is to provide a quick set hydraulic coupler whereby the female member is mounted and in engagement with a lever so as to more easily align the male member for connection.

Still another object of the present invention is to provide a structural design of a quick set hydraulic coupler which utilizes a lever that is compatible and able to be added to equipment within the agricultural, trucking or tractor trailer fields.

It is yet another object of the present invention is to provide a quick set hydraulic coupler capable of using a single lever and pivot point to actuate two female couplings.

These and other objects, features and advantages of the present invention will be clearly understood through a consideration of the detailed description.

SUMMARY OF THE INVENTION

According to the present invention there is provided a quick connect hydraulic coupling having a male and female coupling half retained in coupled relation by displaceable balls carried in the female half. The female half includes a spring biased sleeve portion braced to mount and an inner portion having an attached ring. A lever is pivotably attached to a support member and, when actuated, engages the ring and produces an axial force against the spring bias which causes the inner portion of the female half to extend for coupling the male half.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 5 is a side view of a male and female coupling in the decoupled position just prior to coupling by hand.

FIG. 6 is a perspective view of a dual line embodiment of the quick-set hydraulic coupler system constructed in accordance with the principles of the present invention.

FIG. 7 is a side elevation view of an alternate embodiment of the quick-set hydraulic coupler system constructed in accordance with the principles of the present invention.

DESCRIPTION OF THE PREFERRED EMBODIMENT

Figure 1:
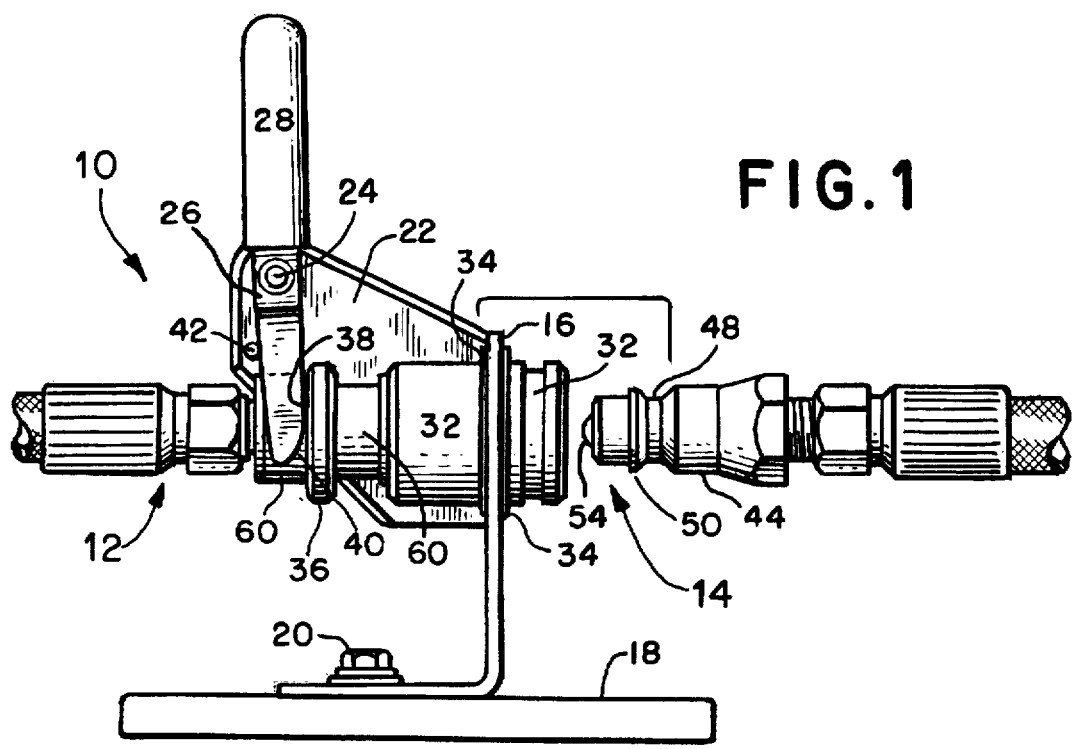
FIG. 1 is a side elevation view of a quick set hydraulic coupler system constructed in accordance with the present invention in the decoupled position.

FIG. 1 illustrates a quick-set hydraulic coupler system 10 constructed in accordance with the principles of the present invention. The system 10 is shown in its decoupled state depicting both the female coupling half 12 and the male coupling half 14. In the Figures, and for descriptive purposes, the female coupling half 12 is shown integral with a bracket 16 which in turn is attached to the mount 18 via bolt 20. However, in use, the bracket 16 can be integral with any equipment within the agricultural, trucking, tractor-trailer fields and the like.

A support member 22 is integral with bracket 16 and provides a fulcrum point 24 for lever 26. Lever 26 comprises an operating portion 28 and a bifurcated portion 30 which circumscribes the female coupling half 12. The female coupling half 12 includes a sleeve portion 32 which extends through the bracket 16 and is affixed thereto on either side with the aid of washers 34. Positioned on the female coupling half 12 is a ring 36 having a lever engaging surface 38 which engages the ring engaging surface 40 of the bifurcated portion 30 of the lever 26 when the lever is actuated. Further positioned on the support member 22 is a stop pin 42 which prevents the lever 26 from pivoting opposite its ring engaging position.

Figure 2:
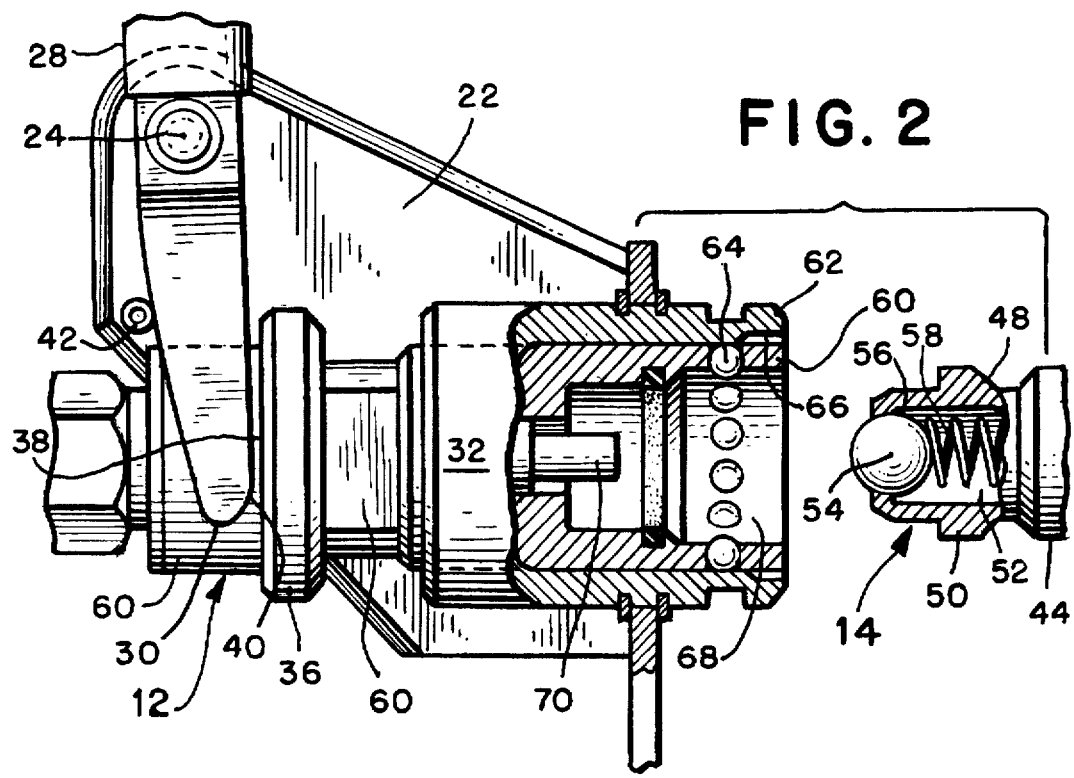
FIG. 2 illustrates the same view as FIG. 1 with a cross sectional view of the main coupling components.
Figure 3:
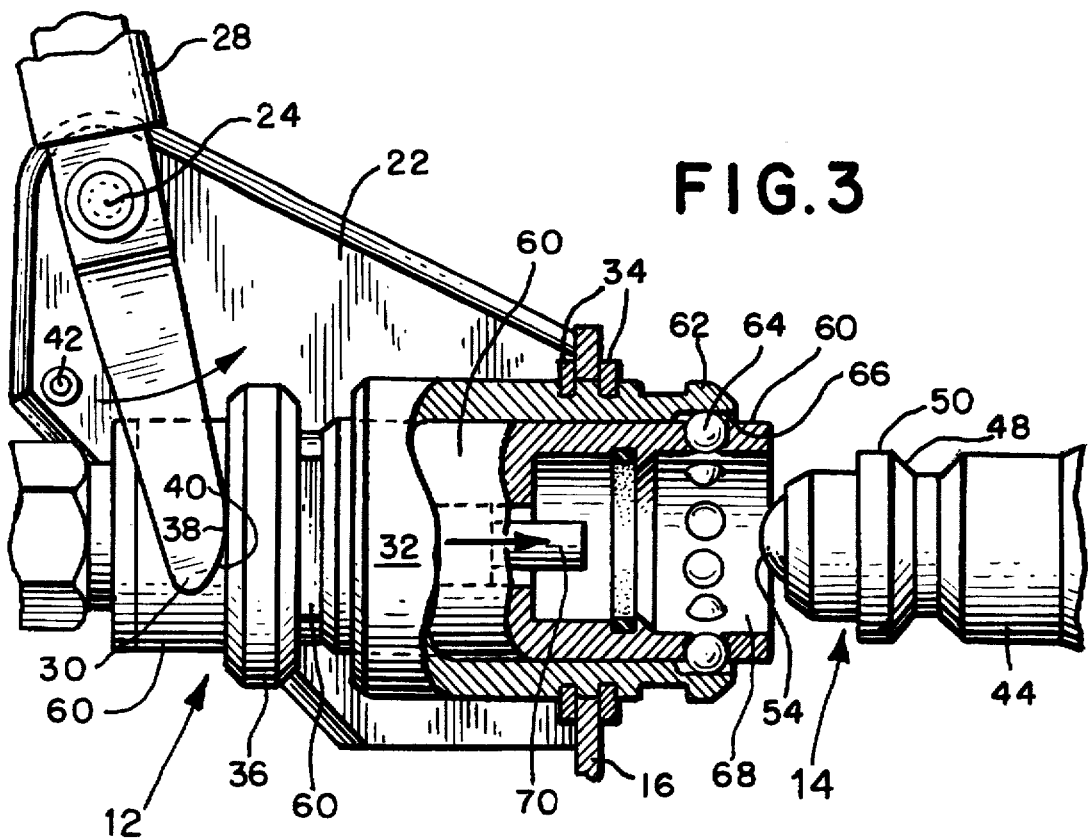
FIG. 3 illustrates the view of FIG. 2 where the female coupling component has been actuated to receive the male component.
Figure 4:
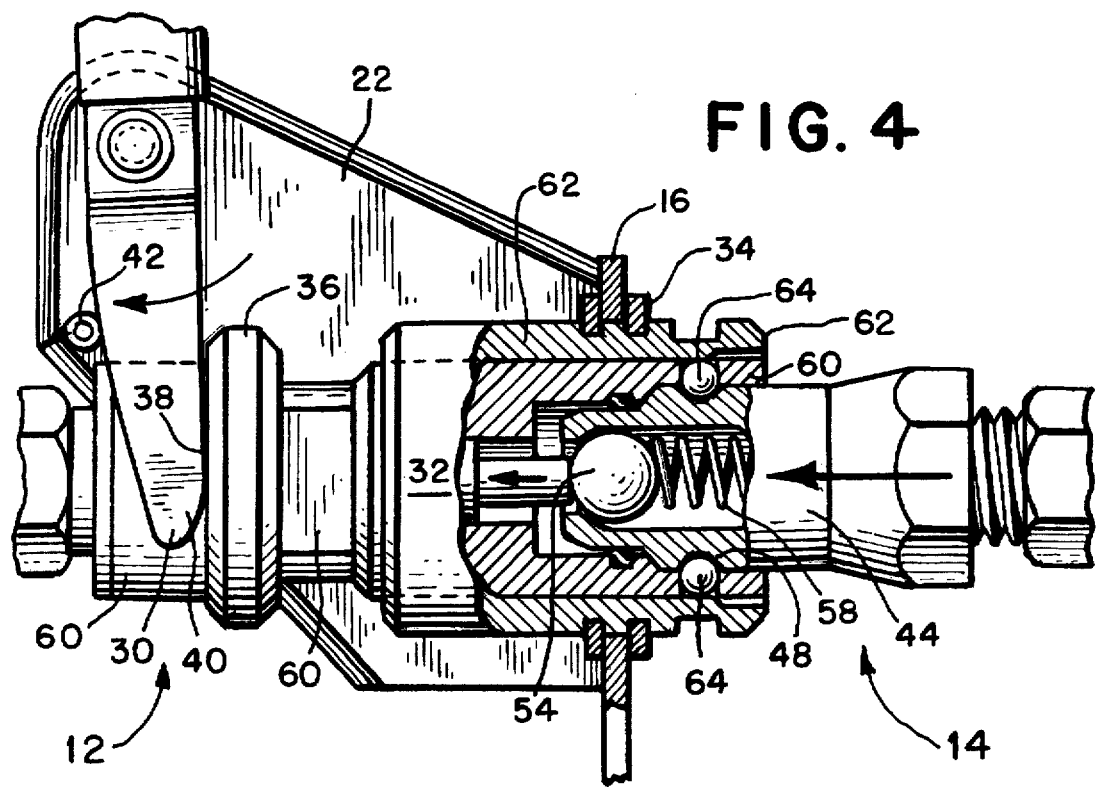
FIG. 4 is a side elevation view of a quick-set hydraulic coupler system constructed in accordance with the present invention with a cross sectional area focusing on the coupled position.

The inner workings of the coupling system can be better understood through the cross sectional portions of FIGS. 2–4. The male coupling half 14 is comprised of a nipple 44 with a free end 46. Also, within the nipple section is a circumferentially extending annular recess 48 and a shoulder 50. Within the flow chamber 52 of male coupling half 14 is a closed ball 54 biased against the seat 56 by the use of a spring 58. This biasing prevents fluid or gas leakage from the male coupling half 14 when not in use or when decoupled from the female coupling half 12.

The female coupling half 12 at the sleeve portion 32 is comprised of an inner member 60 and an outer member 62. The inner member is 60 in the locked position as shown in FIG. 2, but when the lever 26 is actuated the inner member is displaced to the position shown in FIG. 3. A plurality of balls 64 are circumferentially positioned within the inner member. The outer member 62 has a cam surface 66 which coacts with the balls 64 to move the balls from their inner to their outer position as the inner member is moved from its retracted to its extended position. Within the flow chamber 68 of the female coupling half 12 is a second closed ball or a pin 70 biased closed as previously described in the male coupling half.

When it is desired to manually couple or uncouple the coupling, the operating portion 28 of the lever 26 may be displaced away from the coupling, the bifurcated lower end portion 30 and its ring engaging surface 40 engaging against the lever engaging surface 38 of ring 36 and forcing the inner member 60 outwardly relative to the sleeve 32. While the lever is in this position, the male coupling half 14 is released by the balls 64 and may be inserted into or withdrawn from the inner member 60. This process is depicted in FIGS. 2–4 where the coupling and decoupling of the two halves can be seen.

In practice, with the couplers in their decoupled positions as shown in FIG. 2, both the closed ball 54 of the male coupler 14 and the pin 70 of the female coupler 12 are biased so as to prevent any leakage from their respective flow chambers. When the lever 26 is displaced as in FIG. 3, the inner member 60 of the female half 12 extends away from the sleeve 32 and the balls 64 ride up the camming surface 66 thereby increasing the diameter of the circumferentially spaced balls. The male coupler 14 may then be placed inside the female 12 whereby the balls 64 will fit within the annular recess 48. Now, when the lever is released the diameter of the balls will decrease as they transverse the camming surface to eventually lock into the position shown in FIG. 4.

The present invention provides for a quick and easy connect and disconnect coupler which still possesses the standard break away feature should these be an accidental axial loading. This feature provides for the automatic decoupling of the halves should the load reach some predetermined valve. When this occurs, the load will pull the male member free as the shoulder 50 rides past the balls 64. The biased ball and pin closures will keep any substance from leakage by automatically closing shut.

When the coupler of the present invention is not in use and/or during transport, a rubber stopper may be used to keep the female coupling half 12 clean. This stopper is dimensioned as the male coupling half 14 and includes a nipple with a free end as well as a circumferentially extending annular recess and a shoulder. These stoppers may be attached to the coupling system in some way, or may be stored separately when the system is in use.

The major advantage the present invention has over coupling the halves by hand can be seen in FIG. 5. The right hand 72 holding the female coupling half 12 in FIG. 5 needs to both exert an axial force towards the male coupling half 14 and an opposite axial force against the sleeve 32 in order to extend the inner member 60 and release the balls 64. At the same time, the left hand 74 needs to keep the male coupling half 14 aligned with the female coupling half 12 and keep an axial force in that direction. This becomes rather tiresome and difficult, especially in the rain or when the halves are oily. The coupling becomes more efficient and accelerated by the present invention.

Typically a hydraulic system will have two flow lines, one for the intake and one for the outward flow. FIGS. 6 and 7 illustrate the present invention's principles as described with a dual line in the preferred embodiment in FIG. 6 and an alternate embodiment in FIG. 7. FIG. 6 is a perspective view of the quick-set hydraulic coupler system just described with a second coupler opposite the support member 22.

Referring now to the alternate embodiment and FIG. 7. The alternate embodiment uses a single lever to actuate either of the two female coupler halves. The system 10 is shown in its decoupled state depicting both female coupling halves 12. Each half 12 is shown integral with a support member 22 which in turn is attached to the bracket 16 mounted upon mount 18. The support member 22 provides the fulcrum point 24 for lever 26. Lever 26 comprises an operating portion 28 and two cam portions 76 including cam surfaces 78. The female coupling halves 12 include sleeve portions 32 which extend through the support member 22. Positioned on the female coupling halves are rings 36 having lever engaging surfaces 38 which engage the camming surfaces 78 of cam portions 76 when the lever is actuated.

The present invention has been disclosed within a particular embodiment showing a plain mount and support members. It will be understood that the principles disclosed herein are not limited to such structure and should be applied to multiple types of equipment within the agricultural, trucking, or tractor-trailer fields.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A quick connect hydraulic coupling, comprising:

a female coupling half having a spring biased sleeve portion and an inner portion, said inner portion capable of axial movement against said spring bias from a first position to a second position;

a plurality of displaceable balls circumferentially positioned within said inner member, said balls in a locked position when said inner portion is in said first position and in an open position when said inner portion is in said second position;

a mount;

a brace member integral with said mount for securing said sleeve portion;

a support member integral with said brace member;

a lever pivotally mounted on said support member, said lever having an operating portion and an acting portion; and a ring attached to said female half at a position between said sleeve and said lever whereby operating said lever causes said acting portion to engage said ring and extend said inner portion from said first position through said sleeve to said second position thereby positioning said balls in said unlocked position for engagement around a circumferential recess of a male coupling half for coupling said male half to said female half when said lever is released and said sleeve portion is retracted to said first position and said balls are retracted to said locked position.

2. A quick connect hydraulic coupling as defined in claim 1 wherein said operating portion of said lever is on one side of a pivot point and said acting portion is on the opposite side of the pivot point.

3. A quick connect hydraulic coupling as defined in claim 1 wherein said ring is a snap-on O-ring.

4. A quick connect hydraulic coupling as defined in claim 1 wherein said acting portion of said lever is bifurcated for enclosing said inner member of said female half.

5. A quick connect hydraulic coupling as defined in claim 1 wherein said acting portion of said lever includes a front side and a rear, and said support member includes a stopper positioned adjacent one of said sides whereby operating of said lever opposite an engagement direction with said ring is stopped by said stopper.

6. A dual quick connect hydraulic coupler, comprising:

a first and second female coupling half having a first and second spring biased sleeve portion and a first and second inner portion, said inner portions capable of axial movement against said spring bias from a first position to a second position;

a plurality of displaceable balls circumferentially positioned within said inner members, said balls in a locked position when said inner portions are in said first position and in an open position when said inner portions are in said second position;

a mount;

a support member integral with said mount;

a brace member integral with said support member, said brace member securing said first and second sleeve portions;

a lever pivotally mounted on said brace member, said lever having an operating portion and a first and second acting portion, said first and second acting portions further positioned opposite a pivot point of said lever; and a first ring attached to said first female half and a second ring attached to said second female half, said rings positioned between said sleeves and said level whereby operating said lever in a first direction causes said first acting portion to engage said first ring and extend said first inner portion from said first position through said first sleeve to said second position thereby positioning said balls in said unlocked position for engagement around a circumferential recess of a first male coupling half for coupling said first male half to said first female half when said lever is released and said first sleeve portion is retracted to said first position and said balls are retracted to said locked position, said lever further operating lever in a second direction causes said second acting portion to engage said second ring and extend said second inner portion from said first position through said second sleeve to said second position thereby positioning said balls in said unlocked position for engagement around a circumferential recess of a second male coupling half for coupling said second male half to said second female half when said lever is released and said second sleeve portion is retracted to said first position and said balls are retracted to said locked position.

* * * * *